US012177734B2

(12) United States Patent
Whelen et al.

(10) Patent No.: US 12,177,734 B2
(45) Date of Patent: Dec. 24, 2024

(54) SYSTEM AND METHOD FOR VELOCITY-BASED GEOFENCING FOR EMERGENCY VEHICLE

(71) Applicant: WHELEN ENGINEERING COMPANY, INC., Chester, CT (US)

(72) Inventors: George W. Whelen, Old Saybrook, CT (US); Kenneth Lemieux, Groton, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 16/243,692

(22) Filed: Jan. 9, 2019

(65) Prior Publication Data

US 2020/0221250 A1 Jul. 9, 2020

(51) Int. Cl.
*H04W 4/021* (2018.01)
*G08G 1/0965* (2006.01)
(Continued)

(52) U.S. Cl.
CPC .......... *H04W 4/021* (2013.01); *G08G 1/0965* (2013.01); *H04W 4/46* (2018.02); *H04W 4/90* (2018.02)

(58) Field of Classification Search
None
See application file for complete search history.

(56) References Cited

U.S. PATENT DOCUMENTS 4,704,610 A 11/1987 Smith et al.
6,028,514 A 2/2000 Lemelson et al.
(Continued)

FOREIGN PATENT DOCUMENTS

CA 2215440 A1 3/1999
CN 104112348 A 10/2014
(Continued)

OTHER PUBLICATIONS

Anzilotti, E., Can the Private Sector Help Cities Stop Traffic Deaths?, www.fastcompany.com, World Changing Ideas Newsletter, Jan. 2, 2018.
2018 GovTech 100, Next Wave of Civic Innovation, http://www.govtech.com/100/, Jan. 22, 2018.
(Continued)

*Primary Examiner* — Curtis J King
(74) *Attorney, Agent, or Firm* — HOGAN LOVELLS US LLP

(57) ABSTRACT

A system, method and storage medium for providing an emergency vehicle alert includes a first device collecting EV-related data, a management server receiving the EV-related data from the first device, the management server determining a geofence for the EV by dynamically adjusting a size or shape of the geofence at least based on a velocity of the EV-related data, the management server generating a safety warning signal including geofence information associated with the determined geofence, the management server transmitting the safety warning signal to a second device, a second device receiving the safety warning signal, the second device determining whether the another vehicle is located within the geofence based on the safety warning signal, the second device performing one or more alert actions when the another vehicle is located within the geofence, and the second device performing no alert action when the another vehicle is out of the geofence.

27 Claims, 11 Drawing Sheets

222

| Type of EV | Velocity of EV (V mph) | Geofence | G (x) |
|---|---|---|---|
| Police Car | V<40 | Geofence A1 | $G_{A1}(x)$ |
| | 40≤V<55 | Geofence A2 | $G_{A2}(x)$ |
| | 55≤V<70 | Geofence A3 | $G_{A3}(x)$ |
| | 70≤V | Geofence A4 | $G_{A4}(x)$ |
| Fire Truck | V<40 | Geofence B1 | $G_{B1}(x)$ |
| | 40≤V<55 | Geofence B2 | $G_{B2}(x)$ |
| | 55≤V<70 | Geofence B3 | $G_{B3}(x)$ |
| | 70≤V | Geofence B4 | $G_{B4}(x)$ |
| Ambulance | V<40 | Geofence C1 | $G_{C1}(x)$ |
| | 40≤V<55 | Geofence C2 | $G_{C2}(x)$ |
| | 55≤V<70 | Geofence C3 | $G_{C3}(x)$ |
| | 70≤V | Geofence C4 | $G_{C4}(x)$ |

(51) Int. Cl.
*H04W 4/46* (2018.01)
*H04W 4/90* (2018.01)

(56) References Cited

U.S. PATENT DOCUMENTS 6,112,075 A 8/2000 Weiser
6,516,273 B1 2/2003 Pierowicz et al.
6,700,504 B1 3/2004 Aslandogan et al.
6,895,332 B2 5/2005 King et al.
6,958,707 B1 * 10/2005 Siegel .................... G08G 1/087 340/435
7,046,160 B2 5/2006 Pederson et al.
7,085,637 B2 8/2006 Breed et al.
7,271,736 B2 9/2007 Siegel et al.
7,283,045 B1 10/2007 Manz
7,480,514 B2 1/2009 Karaoguz et al.
7,522,998 B2 4/2009 Hughes
7,663,504 B2 2/2010 Votaw et al.
7,868,783 B2 1/2011 Bachelder
7,884,738 B2 2/2011 Pappas et al.
7,899,621 B2 3/2011 Breed et al.
8,094,040 B1 1/2012 Cornett et al.
8,346,468 B2 1/2013 Emanuel et al.
8,350,721 B2 1/2013 Carr
8,487,780 B2 7/2013 Edwardson
8,552,885 B2 10/2013 Rijks
8,581,744 B2 11/2013 Myler
8,593,301 B2 11/2013 Newman
8,624,727 B2 1/2014 Saigh et al.
8,712,429 B2 4/2014 Nagorniak
8,723,680 B1 5/2014 Baker
8,823,548 B2 9/2014 Johnson et al.
8,842,021 B2 9/2014 Behm et al.
8,928,492 B2 1/2015 Boscacci
8,935,036 B1 1/2015 Christensen et al.
8,963,705 B2 2/2015 Miller et al.
9,053,637 B2 6/2015 Mawbey et al.
9,254,781 B2 2/2016 Applebaum
9,278,689 B1 3/2016 Delp
9,412,273 B2 8/2016 Ricci
9,547,986 B1 1/2017 Curlander et al.
9,615,207 B1 * 4/2017 Klein .................... H04W 4/022
9,635,500 B1 * 4/2017 Becker .................. H04W 4/021
9,738,217 B1 8/2017 Bradley et al.
9,742,709 B1 8/2017 Laich
9,756,668 B2 9/2017 Farrell et al.
9,762,470 B2 9/2017 Alam et al.
9,786,154 B1 10/2017 Potter et al.
9,788,160 B1 * 10/2017 Gu ........................ H04W 4/021
9,805,430 B2 10/2017 Miasnik et al.
9,805,601 B1 10/2017 Fields et al.
9,843,913 B2 12/2017 Dahan et al.
9,894,478 B1 * 2/2018 DeLuca ................ H04W 4/022
10,127,813 B2 11/2018 Walsh et al.
10,356,591 B1 * 7/2019 Tengwall ................ H04W 4/02
10,531,224 B1 * 1/2020 Lemieux ............... H04W 4/024
10,559,208 B1 * 2/2020 McAlpine ............. E01C 19/004
10,689,815 B2 6/2020 Sheckler et al.
11,842,631 B2 * 12/2023 Kim ................. G08G 1/096791
2003/0060938 A1 * 3/2003 Duvall ................ B60R 25/1012 701/2
2003/0137415 A1 7/2003 Thomson
2003/0141990 A1 * 7/2003 Coon ................... G08G 1/0965 340/902
2003/0141991 A1 7/2003 Honnavalli
2003/0169181 A1 * 9/2003 Taylor ...................... G08G 1/00 340/902
2004/0246144 A1 * 12/2004 Siegel .................... G08G 1/087 340/902
2004/0263355 A1 * 12/2004 Carroll ................. G08G 1/0965 340/907
2005/0104745 A1 5/2005 Bachelder et al.
2006/0009234 A1 1/2006 Freer
2006/0030984 A1 2/2006 Kamiya
2007/0132608 A1 6/2007 Votaw et al.
2007/0132609 A1 6/2007 Stackelhouse
2007/0159354 A1 * 7/2007 Rosenberg ........... G08G 1/0965 340/902
2008/0088434 A1 4/2008 Frieder et al.
2008/0125970 A1 5/2008 Scheckler
2009/0299625 A1 12/2009 Denaro
2011/0018736 A1 * 1/2011 Carr ..................... G08G 1/0965 340/902
2011/0068949 A1 * 3/2011 Ieda ..................... G08G 1/0965 340/902
2011/0178811 A1 * 7/2011 Sheridan ............... H04W 4/024 705/1.1
2011/0187559 A1 8/2011 Applebaum et al.
2011/0256881 A1 * 10/2011 Huang .................. H04W 4/021 455/456.1
2012/0242511 A1 * 9/2012 Morgan .................. B60R 25/04 340/989
2012/0259537 A1 10/2012 Schmidt et al.
2012/0313792 A1 * 12/2012 Behm .................. G08G 1/0965 340/902
2013/0027221 A1 1/2013 Johnson et al.
2013/0090843 A1 4/2013 Funabashi
2013/0105583 A1 * 5/2013 Peterson ............. A01M 7/0089 235/492
2013/0110292 A1 * 5/2013 Peterson ................ A01C 21/00 700/283
2013/0110357 A1 * 5/2013 Peterson ............. A01M 7/0089 701/50
2013/0173474 A1 * 7/2013 Ranganathan ..... G06Q 20/0655 705/67
2013/0178233 A1 * 7/2013 McCoy ................. H04W 4/027 455/456.3
2013/0295970 A1 * 11/2013 Sheshadri ............... G01S 19/34 455/456.6
2013/0326137 A1 * 12/2013 Bilange ............... G06F 12/0866 711/113
2014/0121932 A1 * 5/2014 Zeng ..................... B60W 10/06 701/93
2014/0172531 A1 * 6/2014 Liberty .............. G06Q 20/3276 705/14.23
2014/0210643 A1 7/2014 Baker
2014/0354449 A1 * 12/2014 Alam .................... H04W 4/029 340/902
2015/0288819 A1 * 10/2015 Brown ................. H04M 3/5116 379/45
2016/0042733 A1 * 2/2016 Yuan ..................... H04W 4/027 704/243
2016/0042767 A1 * 2/2016 Araya .................... G11B 19/02 386/201
2016/0063773 A1 3/2016 Hatton et al.
2016/0071412 A1 3/2016 Bullock et al.
2016/0071417 A1 3/2016 Lewis et al.
2016/0100302 A1 4/2016 Barash et al.
2016/0154117 A1 * 6/2016 Baudia .................... G01S 19/48 342/357.31
2016/0171521 A1 6/2016 Ramirez et al.
2016/0210858 A1 7/2016 Foster et al.
2017/0015239 A1 1/2017 Rao et al.
2017/0078956 A1 * 3/2017 LeBlanc ............... H04W 48/18
2017/0098372 A1 * 4/2017 Eilertsen ............. G08G 1/0133
2017/0098373 A1 4/2017 Filley et al.
2017/0105108 A1 4/2017 South
2017/0187787 A1 6/2017 Syamala et al.
2017/0192429 A1 7/2017 Tseng et al.
2017/0193821 A1 * 7/2017 Baranga ............... G08G 1/0112
2017/0219360 A1 8/2017 Cui et al.
2017/0241660 A1 * 8/2017 Sekar ..................... G05B 15/02
2017/0332347 A1 11/2017 Boss et al.
2017/0353892 A1 12/2017 Elia et al.
2017/0357273 A1 * 12/2017 Michini ................. G05D 1/226
2017/0359712 A1 12/2017 Meredith et al.
2017/0366930 A1 * 12/2017 Treman ................. H04W 4/021
2018/0005523 A1 * 1/2018 Cahan .................... G08G 1/087
2018/0027371 A1 * 1/2018 Austraat ........... H04M 1/72454 455/456.3
2018/0059669 A1 3/2018 Madigan et al.
2018/0087914 A1 * 3/2018 Bravo ................ G01C 21/3415

(56) References Cited

U.S. PATENT DOCUMENTS

| | | | | |
|---|---|---|---|---|
| 2018/0090000 | A1* | 3/2018 | Bravo | G08G 1/0965 |
| 2018/0121956 | A1* | 5/2018 | DeLuca | G06Q 30/0261 |
| 2018/0182240 | A1* | 6/2018 | Baranga | H04W 4/44 |
| 2018/0204447 | A1* | 7/2018 | Morgan | H04W 4/90 |
| 2018/0204469 | A1* | 7/2018 | Moster | B64U 10/13 |
| 2018/0232767 | A1* | 8/2018 | Garg | H04W 4/021 |
| 2018/0268690 | A1 | 9/2018 | Gebers | |
| 2018/0322785 | A1* | 11/2018 | Jerichow | G08G 1/162 |
| 2019/0019297 | A1* | 1/2019 | Lim | G06T 7/246 |
| 2019/0027032 | A1* | 1/2019 | Arunachalam | G08G 1/0965 |
| 2019/0028834 | A1* | 1/2019 | Noble | G06Q 30/0241 |
| 2019/0035269 | A1* | 1/2019 | Donovan | G05D 1/0055 |
| 2019/0082377 | A1 | 3/2019 | Silver | |
| 2019/0088106 | A1* | 3/2019 | Grundstrom | G08B 25/008 |
| 2019/0088140 | A1 | 3/2019 | Sheckler et al. | |
| 2019/0101930 | A1 | 4/2019 | Yadmellat | |
| 2019/0220001 | A1 | 7/2019 | Lavoie et al. | |
| 2019/0325388 | A1* | 10/2019 | McLellan | G06Q 10/0833 |
| 2020/0005415 | A1* | 1/2020 | Schuler | G06Q 50/265 |
| 2020/0168080 | A1* | 5/2020 | Kim | G08G 1/164 |
| 2020/0219401 | A1* | 7/2020 | Ren | H04W 4/021 |
| 2020/0258383 | A1* | 8/2020 | Baranga | H04W 4/44 |
| 2020/0382898 | A1* | 12/2020 | Onishi | H04W 4/021 |
| 2020/0410623 | A1* | 12/2020 | Vahabzadeh | G06Q 10/02 |
| 2021/0058735 | A1* | 2/2021 | Wirola | H04W 4/022 |
| 2021/0186796 | A1* | 6/2021 | Henshue | A61H 1/00 |
| 2022/0392353 | A1* | 12/2022 | Contreras | H04W 12/02 |
| 2024/0257654 | A1* | 8/2024 | Gurel | G06V 20/64 |

FOREIGN PATENT DOCUMENTS

| | | | |
|---|---|---|---|
| CN | 105513392 | | 4/2016 |
| CN | 105857277 | A | 8/2016 |
| CN | 105894857 | A | 8/2016 |
| CN | 108494786 | | 9/2018 |
| DE | 102013008545 | A1 | 11/2014 |
| DE | 102016005114 | A1 | 2/2017 |
| EP | 2325822 | A1 | 5/2011 |
| FR | 3046771 | A1 | 7/2017 |
| JP | 2009198391 | A | 9/2009 |
| JP | 2014201181 | A | 10/2014 |
| KR | 1020160092965 | A | 8/2016 |
| TW | 201115519 | | 5/2011 |
| WO | 2006034246 | A2 | 3/2006 |
| WO | 2015136958 | A1 | 9/2015 |
| WO | 2017082756 | A1 | 5/2017 |
| WO | 2017200754 | A1 | 5/2017 |
| WO | 2017200794 | A1 | 11/2017 |

OTHER PUBLICATIONS

HAAS AlertR2V™ (Responder-to-Vehicle) Technology: Enabling Safer, Faster, Emergency Response, HAAS Inc., 2018.

International Search Report and Written Opinion; Application No. PCT/US2019/012817; Mailed Oct. 9, 2019.

PCT International Search Report and Written Opinion of the International Searching Authority mailed Oct. 8, 2019 in corresponding Application No. PCT/US2019/021604, 15 pages.

International Search Report and Written Opinion issued in PCT/US2018/063210 dated Mar. 7, 2019.

PCT International Search Report and Written Opinion mailed Aug. 27, 2018 from corresponding Application No. PCT/US18/37297, 17 pages.

First Office Action issued in Taiwanese Patent Application No. 109100593, dated Aug. 1, 2023.

* cited by examiner

222

| Type of EV | Velocity of EV (V mph) | Geofence | G (x) |
|---|---|---|---|
| Police Car | $V<40$ | Geofence A1 | $G_{A1}(x)$ |
| | $40\leq V<55$ | Geofence A2 | $G_{A2}(x)$ |
| | $55\leq V<70$ | Geofence A3 | $G_{A3}(x)$ |
| | $70\leq V$ | Geofence A4 | $G_{A4}(x)$ |
| Fire Truck | $V<40$ | Geofence B1 | $G_{B1}(x)$ |
| | $40\leq V<55$ | Geofence B2 | $G_{B2}(x)$ |
| | $55\leq V<70$ | Geofence B3 | $G_{B3}(x)$ |
| | $70\leq V$ | Geofence B4 | $G_{B4}(x)$ |
| Ambulance | $V<40$ | Geofence C1 | $G_{C1}(x)$ |
| | $40\leq V<55$ | Geofence C2 | $G_{C2}(x)$ |
| | $55\leq V<70$ | Geofence C3 | $G_{C3}(x)$ |
| | $70\leq V$ | Geofence C4 | $G_{C4}(x)$ |

FIG. 4

SYSTEM AND METHOD FOR VELOCITY-BASED GEOFENCING FOR EMERGENCY VEHICLE

TECHNICAL FIELD

This application relates to a system or method for effectively providing an emergency vehicle alert to other vehicles by dynamically configuring a size or shape of a geofence for the emergency vehicle to assist the emergency vehicle to safely pass them.

BACKGROUND

When emergency situations such as occurrences of disasters, car accidents, crimes, etc. take place, it is not only critical to send emergency responders to emergency scenes promptly and efficiently to provide rescue efforts to the people involved in the emergency event, but it is also important to guarantee the safety of emergency vehicles (EVs) heading to the emergency scene.

Widely used means to guarantee the safety of EVs includes providing direct emergency vehicle alerts based on conventional audio or visual signaling devices such as flashing lights, sirens and/or horns. However, these conventional signaling devices may not be adequate, or may provide unnecessary alerts to vehicles which are not even on roads that the EV can travel. These alerts may also easily be ignored by people, or go unnoticed by people with hearing impairments or by distracted drivers.

Regarding these issues, U.S. patent application Ser. No. 15/958,550 discloses a method for generating a safety zone based on node data collected from emergency equipments and giving warning messages to other vehicles when they approach near the zone, the entire disclosure of which are incorporated by reference herein.

However, no prior work has been made on determining an appropriate size or shape of the EV geofence in consideration of a velocity and/or type of the EV.

SUMMARY OF THE INVENTION

Aspects of the present disclosure are a system, method and storage medium for providing an emergency vehicle alert to other vehicles traveling on roads nearby an emergency vehicle (EV).

In one aspect, there is provided a system for providing an emergency vehicle alert. The system includes a first device, a management server and a second device. The first device is installed as a part of an EV or attached to the EV. The first device includes one or more sensors configured to collect EV-related data from the EV, a first processor configured to generate a data signal including the EV-related data, and a first transmitter configured to transmit the data signal to the management server. The management server in communication with the EV includes: a receiver configured to receive the data signal from the EV; a second processor configured to determine a geofence for the EV based on the received EV-related data of the data signal and generate a safety warning signal including geofence information associated with the geofence; and a second transmitter configured to transmit a safety warning signal to the second device. The second device is installed as a part of another vehicle near the EV or attached to the another vehicle. The second device includes another receiver, a third processor and an alert-generation device. The another receiver is configured to receive the safety warning signal. The third processor is configured to: determine whether the another vehicle is located within the geofence based on the safety warning signal; control the alert-generation device to perform one or more alert actions when the another vehicle is located within the geofence; and control the alert-generation device to perform no alert action when the another vehicle is out of the geofence. The alert-generation device is configured to perform the alert actions.

In one embodiment, the EV-related data may include a velocity of the EV, and a size or shape of the geofence may be dynamically adjusted at least based on the velocity of the EV.

In one embodiment, the geofence information may include a set of location coordinates corresponding to a boundary of the geofence.

In one embodiment, the geofence information may include an indication that can be used by the second device to retrieve the geofence.

In one embodiment, the EV-related data may include a velocity of the EV. The size of the geofence may increase when the velocity of the EV increases, and the size of the geofence may decrease when the velocity of the EV decreases.

In one embodiment, the geofence may be defined to extend farther in a forward direction of the EV than any other directions.

In one embodiment, the geofence may be defined to exclude all locations in a rear direction of the EV.

In one embodiment, the EV-related data may include at least one of a location of the EV, an ID of the EV, a type of the EV and a velocity of the EV.

In one embodiment, to determine the geofence, the second processor may further be configured to read out the geofence from a mapping table based on the at least one of the EV-related data.

In one embodiment, the alert actions may include at least one of an audible warning signal and a visual warning signal to an operator of the another vehicle.

In one embodiment, the safety warning signal may include at least one of an ID of the EV, geofence information, a type of the EV, one or more alert actions and a location of the EV.

In another aspect of the present disclosure, there is provided a system for providing an emergency vehicle alert. The system includes a receiver and a processor. The receiver is configured to receive EV-related data transmitted from an EV. The processor is configured to determine a geofence for the EV at least based on the EV-related data by dynamically adjusting a size or shape of the geofence at least based on a velocity of the EV-related data.

In one embodiment, the processor may further be configured to generate a safety warning signal including geofence information associated with the geofence.

In one embodiment, the system may further include a second transmitter configured to transmit the safety warning signal to another device installed as a part of another vehicle near the EV or attached to the another vehicle.

In still another aspect of the present disclosure, there is provided a method for providing an emergency vehicle alert. The method includes a first device collecting EV-related data, a management server receiving the EV-related data from the first device, the management server determining a geofence for the EV by dynamically adjusting a size or shape of the geofence at least based on a velocity of the EV-related data, the management server generating a safety warning signal including geofence information associated with the determined geofence, the management server transmitting the safety warning signal to a second device, the second device receiving the safety warning signal, the second device determining whether the another vehicle is located within the geofence based on the safety warning signal, the second device performing one or more alert actions when the another vehicle is located within the geofence, and the second device performing no alert action when the another vehicle is out of the geofence.

In still yet another aspect of the present disclosure, there is provided a method for providing an emergency vehicle alert. The method includes a management server receiving EV-related data transmitted from an EV and the management server determining a geofence for the EV by dynamically adjusting a size or shape of the geofence at least based on a velocity of the EV-related data.

In still yet another aspect of the present disclosure, there is provided a computer-readable storage medium having computer readable program instructions. The computer readable program instructions read and executed by at least one processor for performing a method for providing an emergency vehicle alert. The method includes a management server receiving EV-related data transmitted from an EV and the management server determining a geofence for the EV by dynamically adjusting a size or shape of the geofence at least based on a velocity of the EV-related data.

BRIEF DESCRIPTION OF THE DRAWINGS

The present disclosure will become more readily apparent from the specific description accompanied by the drawings.

FIG. 4 depicts an example mapping table where mapping relationships among a type of an EV, a velocity of the EV and a corresponding geofence are defined according to an exemplary embodiment of the present disclosure;

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "Geofence" of an emergency vehicle (EV) is defined as a boundary of a safety alert zone where other one or more vehicles in the vicinity of the EV are alerted to the presence of the EV. Thus, it can be appreciated that a zone encompassed by the geofence can be a safety alert zone. Further, "Geofencing" for an EV can be understood as generating the safety alert zone for the EV.

Figure 1:
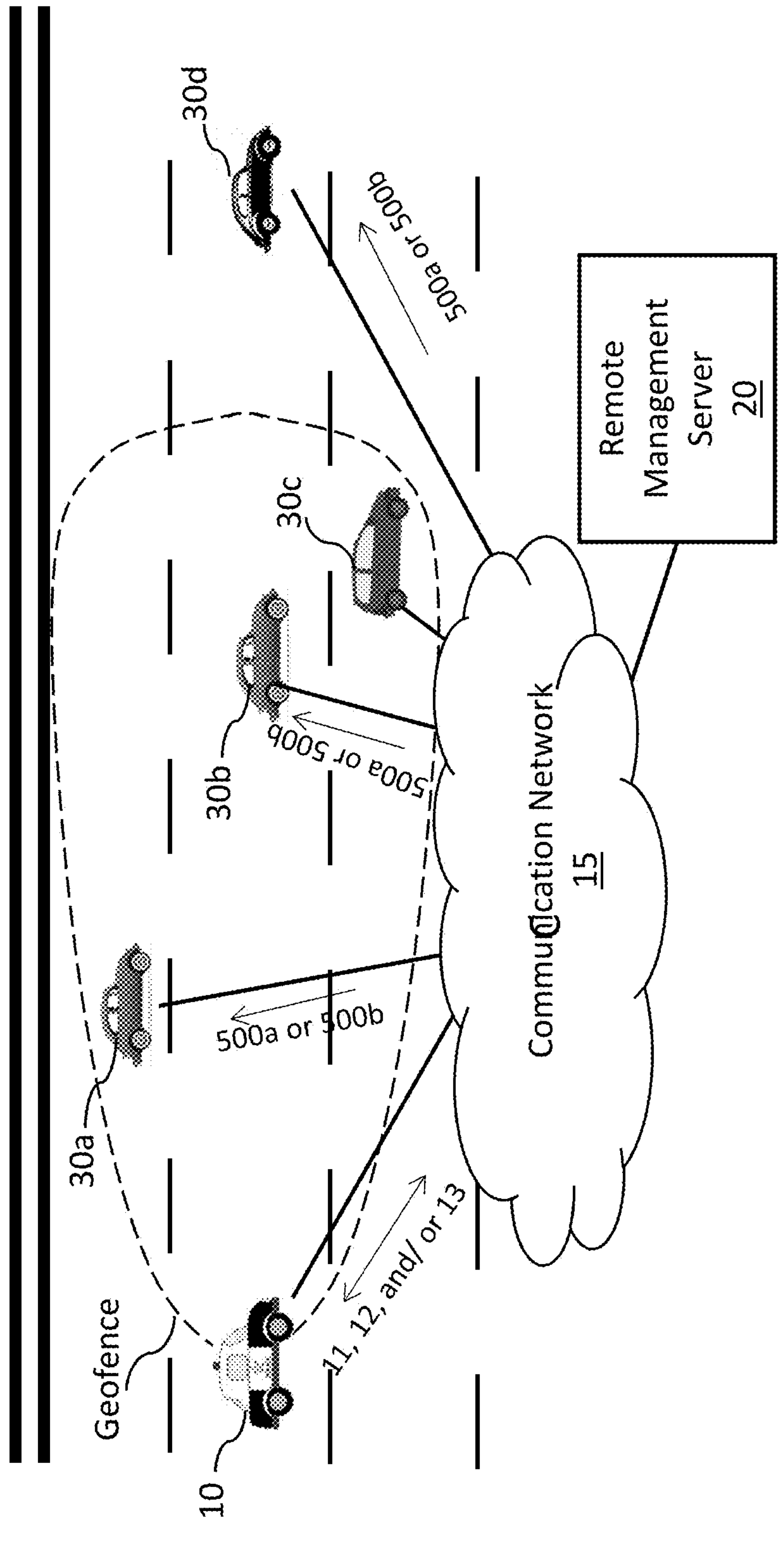
FIG. 1 depicts an example environment where an EV alert management network is operated according to an exemplary embodiment of the present disclosure.

FIG. 1 depicts an example environment where an EV alert management network is operated according to an exemplary embodiment of the present disclosure.

Referring now to FIG. 1, an EV 10 communicates with a remote management server 20 through a communication network 15 for exchanging EV-related data 11, an emergency indication signal 12, an emergency state release signal 13 and/or the like, and the remote management server 20 communicates with each of other vehicles 30*a* to 30*d* which travel on roads nearby the EV 10.

Figure 2A:
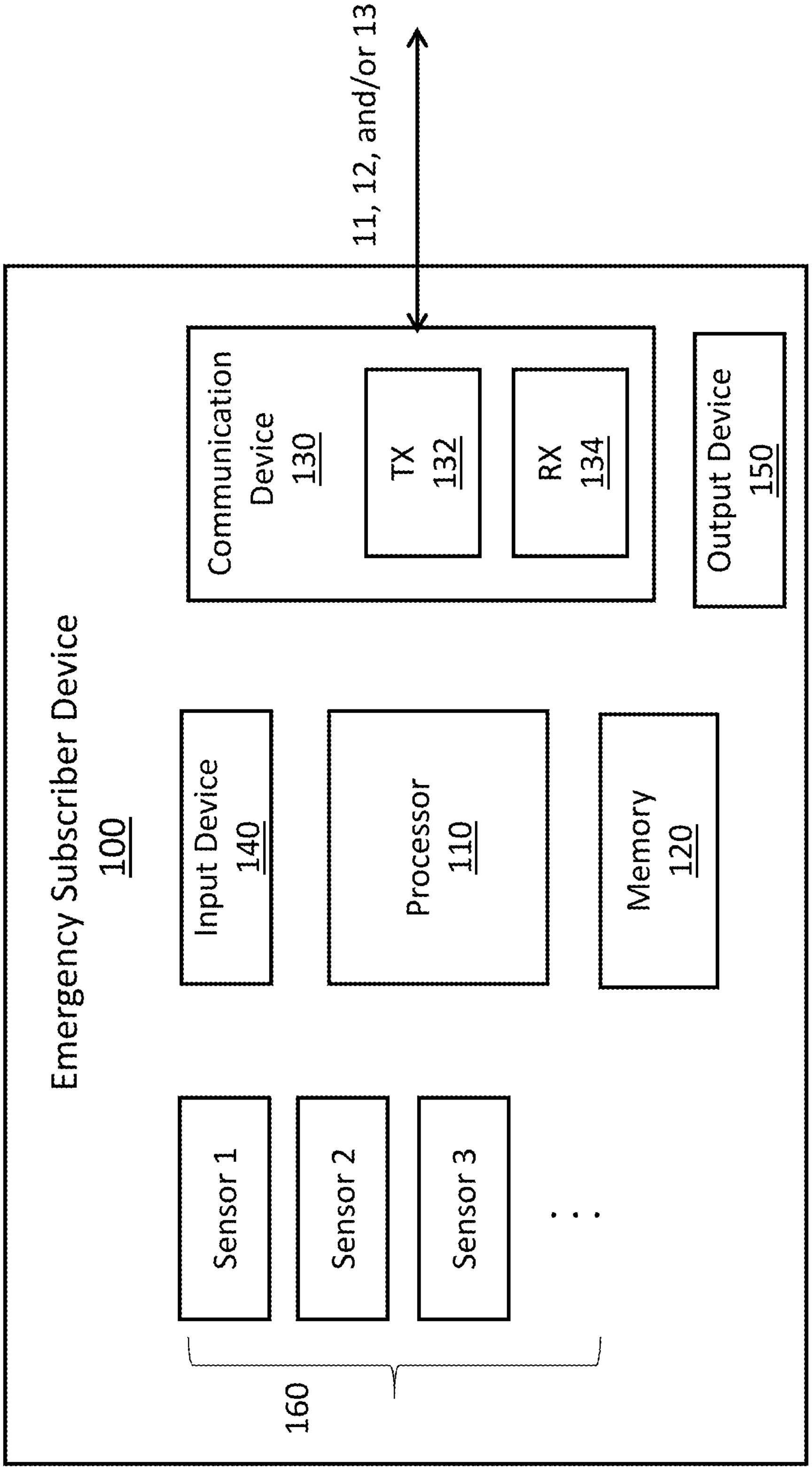
FIG. 2A depicts a block diagram of an emergency subscriber device according to an exemplary embodiment of the present disclosure.
Figure 2B:
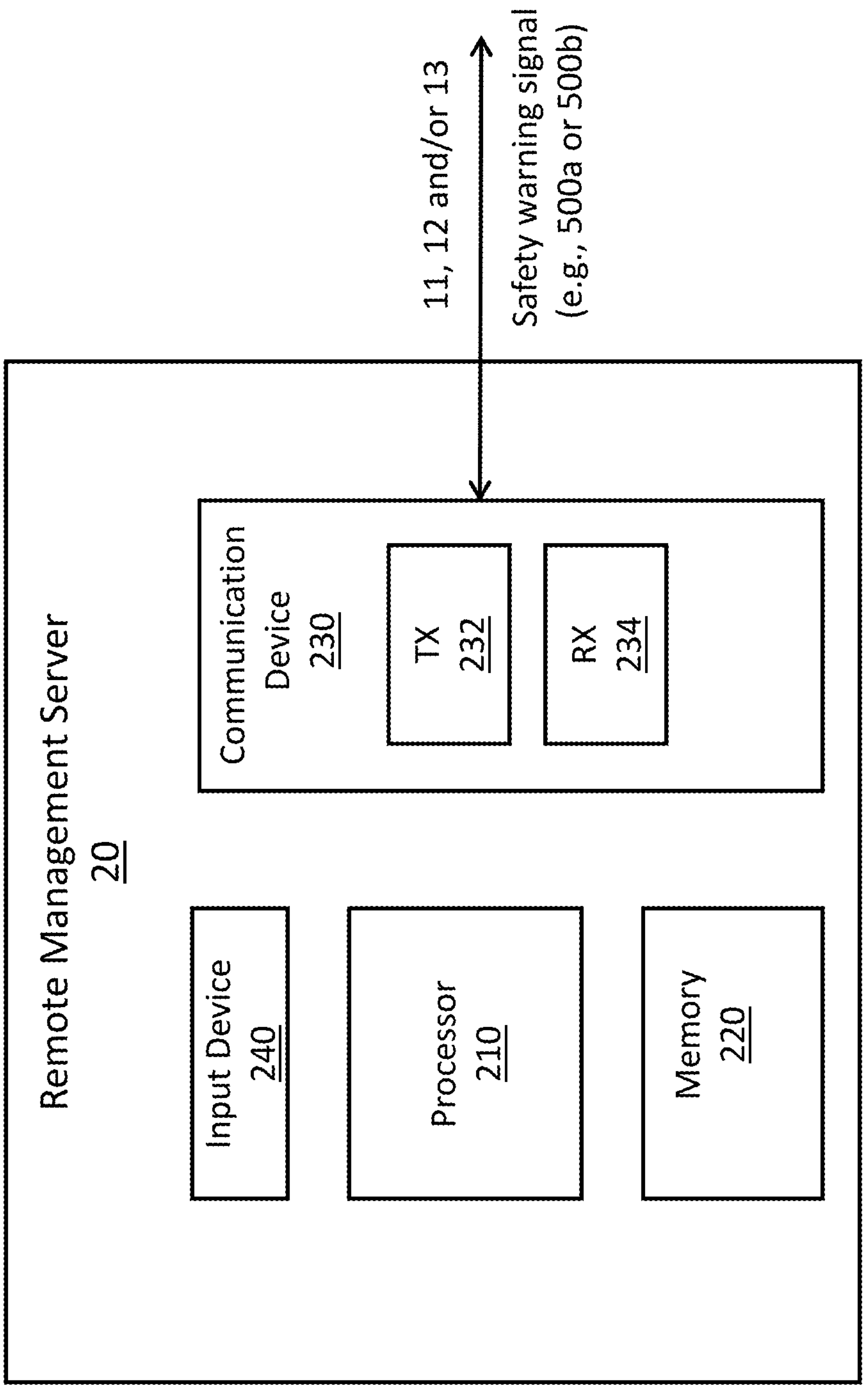
FIG. 2B depicts a block diagram of a remote management server according to an exemplary embodiment of the present disclosure.
Figure 2C:
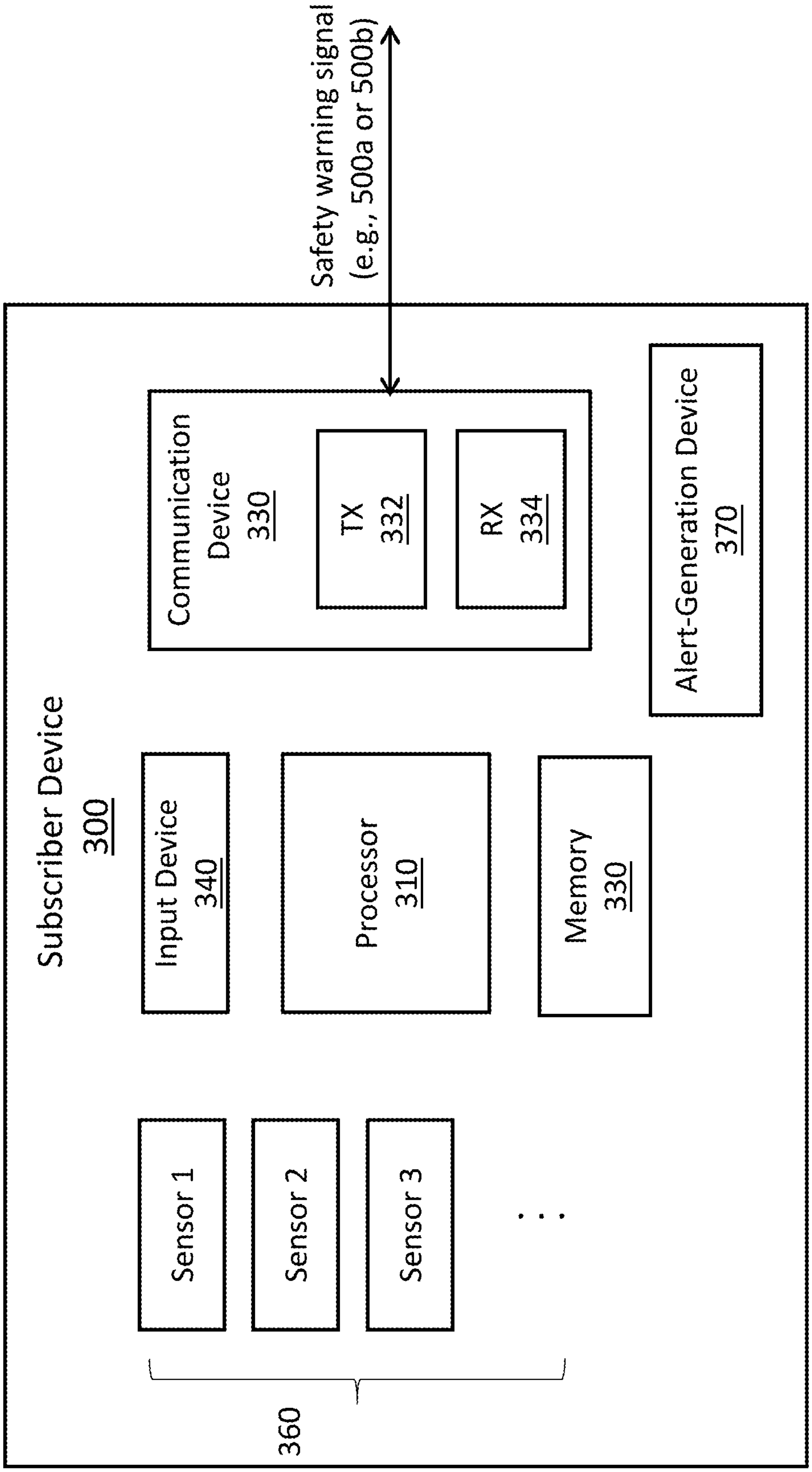
FIG. 2C depicts a block diagram of a subscriber device receiving an EV alert from the remote management server according to an exemplary embodiment of the present disclosure.

FIG. 2A depicts a block diagram of an emergency subscriber device 100 according to an exemplary embodiment of the present disclosure. FIG. 2B depicts a block diagram of a remote management server 20 according to an exemplary embodiment of the present disclosure. FIG. 2C depicts a block diagram of a subscriber device 300 receiving an EV alert from the remote management server 20 according to an exemplary embodiment of the present disclosure.

In one embodiment, the emergency subscriber device 100 can be installed as a part of the EV 10, or a wearable or portable device attached to the EV 10. Similarly, in one embodiment, the subscriber device 300 can be installed as a part of each vehicle 30*a* to 30*d*, or attached to the vehicle.

Referring particularly to FIG. 2A, the emergency subscriber device 100 includes a processor 110, a memory 120, an input device 140, an output device 150, a communication device 130 and one or more sensor devices 160.

When the EV 10 is in an emergency state where it heads to an emergency scene, the emergency subscriber device 100 triggers an emergency state and transmits an emergency indication signal 12 to the remote management server 20 using the transmitter 132. The emergency indication signal 12 indicates that the EV is in an emergency state, and upon receiving the emergency indication signal 12, the remote management server 20 can perform one or more safety actions to provide an alert of the EV 10 to other vehicles 30*a* to 30*d* traveling on roads nearby the EV 10. The safety actions may include: determining a geofence, generating a safety warning signal (e.g., 500*a* of FIG. 3A or 500*b* of FIG. 3B) based on the determined geofence; and transmitting the safety warning signal to the other vehicles 30*a* to 30*d* nearby the EV 10, more details of which will be described later. The emergency indication signal 12 may include an ID of the EV, and optionally, various EV-related data such as a type of the EV, a location of the EV, a velocity of the EV, or the like.

By way of example, the emergency state can automatically be triggered when flashing lights, sirens and/or horns of the EV 10 are activated. However, exemplary embodiments of the present disclosure are not limited thereto.

In some examples, the EV-related data 11 can be incorporated into the emergency indication signal 12, or can separately be transmitted from the emergency indication signal 12. In further examples, the EV-related data 11 can be transmitted only upon the transmission of the emergency indication signal 12, or can be transmitted regardless thereof.

In addition, the sensor devices 160 collects the EV-related data 11. For example, the sensor data such as the location and the velocity can be collected using sensor devices 160 including, but are not limited to: an accelerometer, a global positioning system (GPS) receiver, a velocity sensor, a motion sensor, infrared light sensors, radar, laser radar, cameras, a gyroscope, or the like. The collected EV-related data 11 may be stored in the memory 120 or other storage (not shown).

In addition, the memory 120 includes program instructions executable by the processor 110 to perform functions or operations of the emergency subscriber device 100 described in the present disclosure. The processor 110 reads the stored data which have been collected from the sensor devices 160 and processes to generate messages that will be transmitted to the remote management server 20 through the transmitter 132 of the communication device 130. In one embodiment, the receiver 134 of the communication device 130 can be used to receive a control or confirmation signal from the remote management server 20.

The communication network 15 may be implemented using a wireless communication technique based on radio-frequency identification (RFID), code division multiple access (CDMA), global system for mobile communication (GSM), wideband CDMA, CDMA-2000, time division multiple access (TDMA), long term evolution (LTE), FirstNet, wireless LAN, Bluetooth, or the like. The communication device 130 may be implemented to support at least one of the above-mentioned communication techniques.

The input device 140 can be, but is not limited to: a keyboard, a touch screen, an audio input system, a voice recognition system, or the like. The output device 150 can be, but is not limited to: a screen, a speaker, a light, a siren, a visual system, an audio system, or the like.

Referring further to FIG. 2B, the remote management server 20 includes a processor 210, a memory 220, a communication device 230, and input device 240. The remote management server 20 may reside on a network infrastructure or on a third-party service provider, such as a cloud storage and computing system. The remote management server 20 receives the EV-related data 11 using a receiver 234 of the communication device 230 transmitted over the communication network 15 and store the data 11 into the memory 220.

The communication device 230 includes a transmitter 232 and the receiver 234. The communication device 230 may be implemented to support at least one of the above-mentioned communication techniques such as RFID, CDMA, GSM, wideband CDMA, CDMA-2000, TDMA, LTE, wireless LAN, Bluetooth, or the like. The input device 240 can be, but is not limited to: a keyboard, a touch screen, an audio input system, a voice recognition system, or the like.

Upon receiving the emergency indication signal 12 from the EV 10, the processor 210 determines a geofence for the EV based on the EV-related data 11 and generate the safety warning signal based on the geofence. The remote management server 20 transmits the generated safety warning signal to other vehicles 30*a* to 30*d* traveling on roads nearby the EV 10 using the transmitter 232.

Figure 3A:
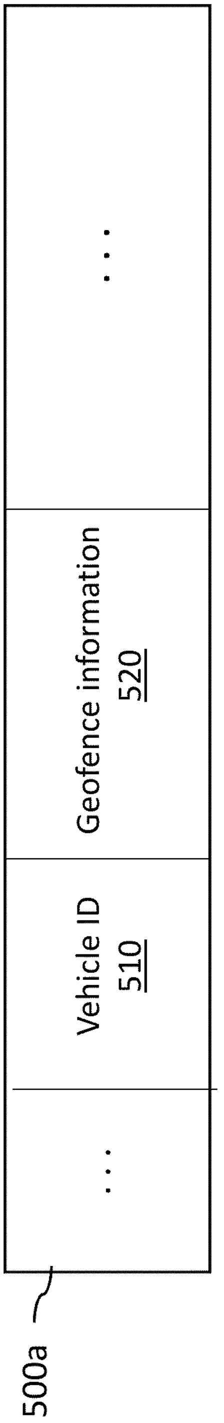
FIG. 3A depicts an example safety warning signal generated by a remote management server and transmitted to a subscriber device of each of other vehicles according to an exemplary embodiment of the present disclosure.

In one embodiment, referring to FIG. 3A, illustrated is an example safety warning signal 500*a* generated by the processor 210 of the remote management server 20 and transmitted to the subscriber device 300 of each vehicle 30*a* to 30*d*. The safety warning signal 500*a* includes, but is not limited to: an EV ID 510 and geofence information 520 related to the EV ID 510. The geofence information 520 can be any information used for identifying directly or indirectly features (e.g., size or shape) of the geofence for the EV 10.

Figure 3B:
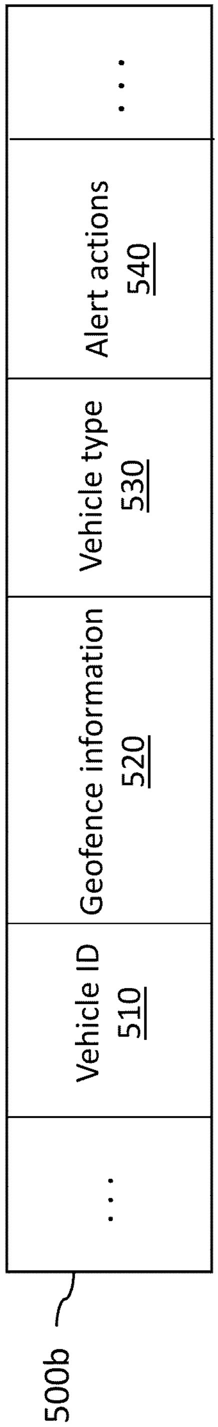
FIG. 3B depicts an example safety warning signal generated by a remote management server and transmitted to a subscriber device of each of other vehicles according to an exemplary embodiment of the present disclosure.

Referring to FIG. 3B, illustrated is another example safety warning signal 500*b* that further includes an EV type 510 and one or more alert actions 540 for each vehicle 30*a* to 30*d* to follow when a certain condition is met. The certain condition may include that a current location of each vehicle 30*a* to 30*d* is matched to a geofence defined by the geofence information.

In one embodiment, the geofence information 520 is directly provided as a set of location coordinates corresponding to a boundary of the determined geofence.

In another embodiment, the geofence information 520 is indirectly provided as an indication (e.g., geofence function G(x)) that can be used by the subscriber device 300 to retrieve the geofence from the geofence information 520, more details of which will be described with reference to FIG. 2C. When the geofence information 520 is indirectly provided as an indication that can be used by the subscriber device 300, a current location of the EV 10 may be provided in the safety warning signal 500*a* and/or safety warning signal 500*b*, so that the subscriber device 300 can combine the EV current location to generate a more exact geofence defined around the EV 10, and/or the subscriber device 300 tracks of the EV 10's movement based on the EV current location and displays on a visual system thereof. By way of example, the indication can be an index identifying a specific geofence, and information regarding relationships between the indices and their respective mapping geofences can be prestored in the memory 320 of the subscriber device 300, so that the subscriber device 300 can read out an appropriate geofence based on the index.

In one embodiment, the processor 210 of the remote management server 20 may further generate a confirmation signal (not shown) to transmit it back to the EV 10 when, before, and/or after the safety warning signal 500*a* or 500*b* is transmitted to the vehicles 30*a* to 30*d*, so that the EV 10 may recognize that the emergency state thereof has been transferred to the remote management server 20 and the safety action for the EV has started. In some examples, the safety warning signal 500*a* or 500*b* is transmitted to the subscriber device 300 of each vehicle 30*a* to 30*d*, and the processor 310 of the subscriber device 300 processes the geofence information 520 in the safety warning signal 500*a* or 500*b* to display the geofence through a display of the alert-generation device 370 of the subscriber device 300.

Referring further to FIG. 2C, the subscriber device 300 includes a processor 310, a memory 320, a communication device 330, an input device 340, and an alert-generation device 370. Each vehicle 30*a* to 30*d* may be a vehicle registered for services that provide emergency vehicle alerts, so that at least one of the above components thereof is designed to have features to receive the emergency vehicle alerts.

For example, the communication device 330 includes a transmitter 332 and a receiver 334 which are implemented to support at least one of the above-mentioned communication techniques being capable of communicating with the communication device 230 of the remote management server 20 and/or the communication device 130 of the EV 10.

The safety warning signal 500*a* or 500*b* received through the receiver 334 may be stored in the memory 320. The processor 310 may retrieve a geofence for the EV 10 based on the safety warning signal 500*a* or 500*b*.

In one embodiment, if the geofence information 520 is provided as a set of location coordinates corresponding to a boundary of the determined geofence, the processor 310 of the subscriber device 300 determines whether a current location of the corresponding vehicle is matched to the geofence of the EV 10 based on the set of location coordinates in the geofence information 520. For example, if the current location of each vehicle 30*a* to 30*d* is within the boundary defined by the set of location coordinates, the processor 310 determines a match between the vehicle current location and the geofence; otherwise, it determines a mismatch therebetween. If the match is found between the current location and the geofence, the processor 310 controls the alert-generation device 370 to perform one or more alert actions; otherwise (e.g., if no match is found therebetween), the processor 310 discards the safety warning signal 500*a* or 500*b* and performs no further action for providing the EV alert.

In one embodiment, if the geofence information 520 is provided as an indication for geofence (e.g., geofence function G(x)) as discussed above, the processor 310 further retrieves the geofence based on the geofence information 520 (e.g., based on the geofence function G(x)), and then determines whether the vehicle current location is located within the geofence or not. If a match is found between the current location and the geofence, the processor 310 controls the alert-generation device 370 to perform one or more alert actions; otherwise (e.g., if no match is found therebetween) the processor 310 discards the safety warning signal 500*a* or 500*b* and performs no further action for providing the EV alert.

In one embodiment, the alert-generation device 370 is configured to perform alert actions under control of the processor 310. The alert-generation device 370 can be, but is not limited to: a screen, a speaker, a light, a siren, a visual system, an audio system, or the like. The input device 340 can be, but is not limited to: a keyboard, a touch screen, an audio input system, a voice recognition system, or the like. The current location can be collected using the sensor devices 360 such as a positioning device, as shown in FIG. 2C.

In one embodiment, the alert actions include generating a visual and/or audible warning signal for a driver to recognize an EV alert for next safety actions such as yielding for the EV to let the EV safely pass.

In one embodiment, the alert actions are preprogrammed and stored in the memory 320 of the subscriber device 300, and when a match is found between the current location and the geofence, the processor 310 reads the alert actions from the memory 320 to control the alert-generation device 370 to perform the alert actions.

In one embodiment, the alert actions are transferred from the remote management server 20 to the subscriber device 300 of each vehicle 30*a* to 30*d* through the alert action information field 520 in the safety warning signal 500*b*, as depicted in FIG. 3B. In this case, the processor 310 controls the alert-generation device 370 to perform the alert actions, as instructed in the alert action information field 540.

In one embodiment, the geofence can dynamically be adjusted in size or shape according to a velocity and/or type of the EV 10. For example, when determining the geofence for the EV 10, the processor 210 of the remote management server 20 dynamically changes the shape or size of the geofence based on the velocity and/or type of the EV 10 provided in the EV-related data 11. In further examples, if the velocity of the EV 10 gets faster, the size of the geofence can be increased, thus sending the EV alert to vehicles traveling over a farther region to enhance the safety of the EV passing the vehicles. If the velocity of the EV 10 gets slower, the size of the geofence can be decreased.

In one embodiment, the memory 220 may include information of geofences which are respectively appropriate to respective velocities of the EV, respective types of the EV and/or a combination thereof. The processor reads out a corresponding geofence from the memory 220 based on the velocity and/or the type of the EV.

Figure 5:
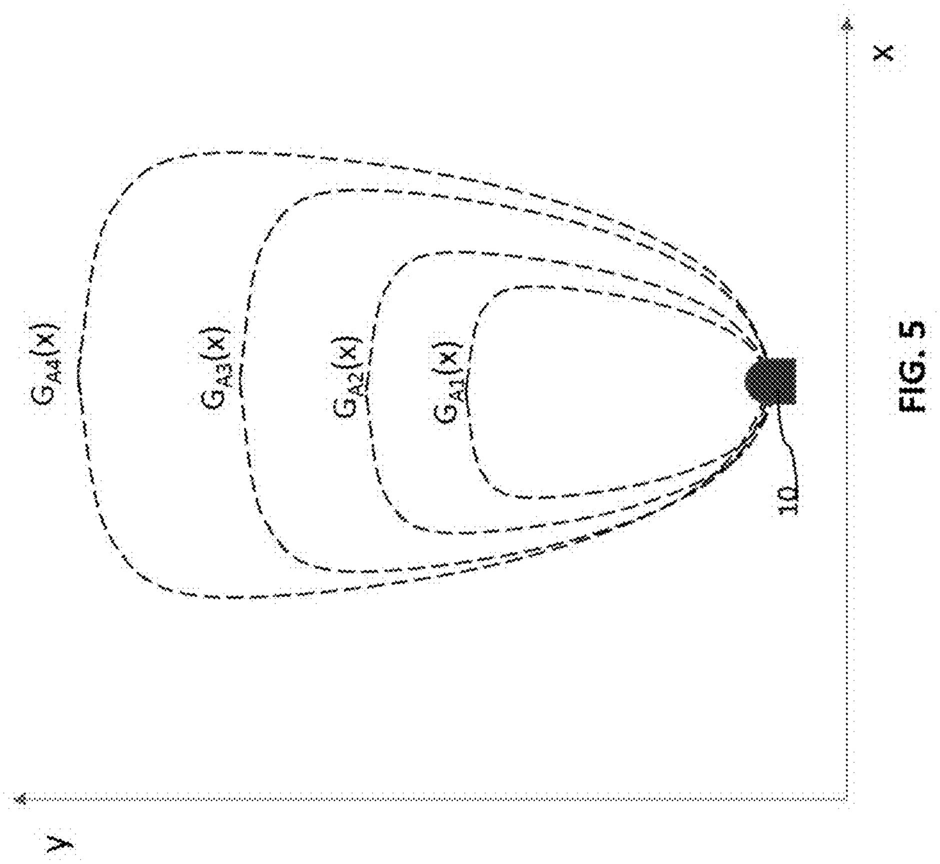
FIG. 5 depicts example geofences varying depending on variation of the velocity of an EV according to an exemplary embodiment of the present disclosure.

FIG. 4 depicts an example mapping table where mapping relationships among a type of an EV, a velocity of the EV and a corresponding geofence are defined according to an exemplary embodiment of the present disclosure. FIG. 5 depicts example geofences varying depending on variation of the EV velocity according to an exemplary embodiment of the present disclosure. The mapping table 222 may be stored in the memory 220 of the remote management server 20. In one embodiment, the processor 210 may look up the mapping table 222 to determine a corresponding geofence for a given EV type and velocity.

Referring now to FIG. 4, the EV type includes, but are not limited to: a police car, a fire truck, an ambulance, a maintenance vehicle (not shown), or the like. A geofence to be read from the table 222 varies depending on the EV type and/or EV velocity. In an example shown in FIG. 4, when a policer car travels at a velocity less than 40 mph, a geofence will be determined as “Geofence A1” defined by a geofence function $G_{A1}(x)$; when the policer car travels at a velocity between 40 mph and 55 mph, a geofence will be determined as “Geofence A2” defined by a geofence function $G_{A2}(x)$; when the policer car travels at a velocity between 55 mph and 70 mph, a geofence will be determined as “Geofence A3” defined by a geofence function $G_{A3}(x)$; and when the policer car travels at a velocity more than 70 mph, a geofence will be determined as “Geofence A4” defined by a geofence function $G_{A4}(x)$. The example shapes of the geofence functions depend on the velocity of the police car are illustrated in FIG. 5.

Similarly, as the velocity of a fire truck increases over 40 mph to 70 mph, geofences to be determined will vary from Geofence B1, Geofence B2, Geofence B3 to Geofence B4 which are respectively defined by geofence functions of $G_{B1}(x)$, $G_{B2}(x)$, $G_{B3}(x)$ and $G_{B4}(x)$. In addition, as the velocity of an ambulance increases over 40 mph to 70 mph, geofences to be determined will vary from Geofence C1, Geofence C2, Geofence C3 to Geofence C4 which are respectively defined by geofence functions of $G_{C1}(x)$, $G_{C2}(x)$, $G_{C3}(x)$ and $G_{C4}(x)$.

It should also be noted that the geofences to be determined will vary depending on the type of an EV. In case of a police car chasing a getaway vehicle, it is more likely that vehicles over a broader region can be involved in an accident with the police car or the getaway vehicle, and in this example, the geofences for the police car can be defined to cover more broad regions of roads in providing an EV alert.

Once a specific geofence for an EV 10 is determined, the determined geofence can be combined with a current location of the EV 10 provided with the EV-related data 11 to generate the geofence information 520 of the safety warning signal 500*a* or 500*b*. The geofence information 520 may be a geofence function G(x) defined with respect to the current location of the EV 10.

Figure 6C:
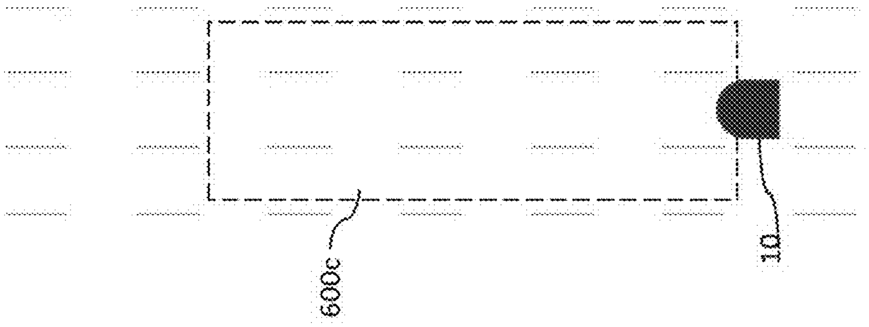
FIGS. 6A to 6C depict example shapes of geofences determined by a remote management server according to an exemplary embodiment of the present disclosure.
Figure 6B:
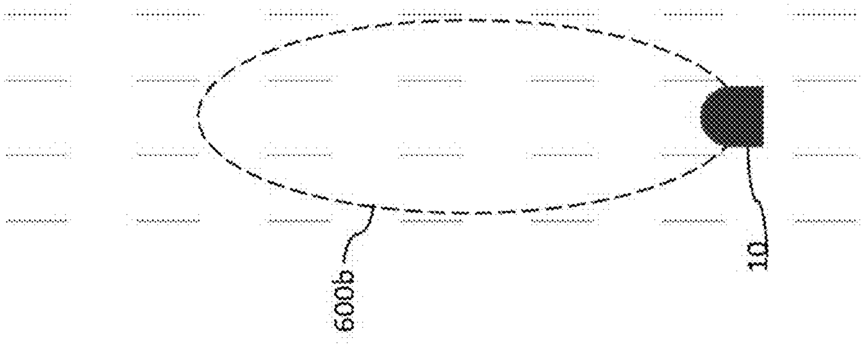
Figure 6A:
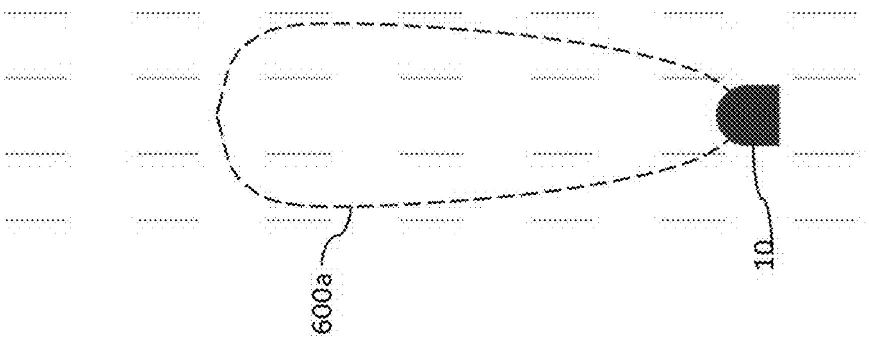

FIGS. 6A to 6C depict example shapes of geofences determined by the processor 210 of the remote management server 20 according to an exemplary embodiment of the present disclosure.

Referring to an example shown in FIG. 6A, the geofence 600*a* may be of shape of a modified oval shape where it is defined to cover a farther region in a forward direction than in lateral directions, so that the EV alert can be provided to vehicles located at a farther distance in the forward direction from the EV 10, reducing unnecessary EV alerts to vehicle traveling in the lateral direction, particularly, e.g., vehicles located in different lanes where the EV 10 travels. A width in the lateral direction of the geofence 600*a* increases as it gets farther in the forward direction from the EV 10. For example, a width in the lateral direction of the geofence 600*a* near the EV 10 is smaller than a width in the lateral direction of the geofence 600*a* near the end point thereof.

Referring to an example shown in FIG. 6B, the geofence 600*b* may be of shape of an oval shape where it is defined to cover a farther region in a forward direction than in lateral directions, but a width in the lateral direction of the geofence 600*b* has a maximum at the middle in the forward direction and has a minimum at both locations near the EV 10 and the end point of the geofence 600*b*.

Referring to an example shown in FIG. 6C, the geofence 600*c* may be of shape of a rectangular where it is defined to cover a farther region in a forward direction than in lateral directions, but a width in the lateral direction of the geofence 600*b* does not vary as it gets farther in the forward direction from the EV 10.

Although it is illustrated in figures that geofences are provided in a two-dimensional fashion, exemplary embodiments of the present disclosure are not limited thereto. For example, a geofence for an EV can be provided in a three-dimensional fashion.

Figure 7A:
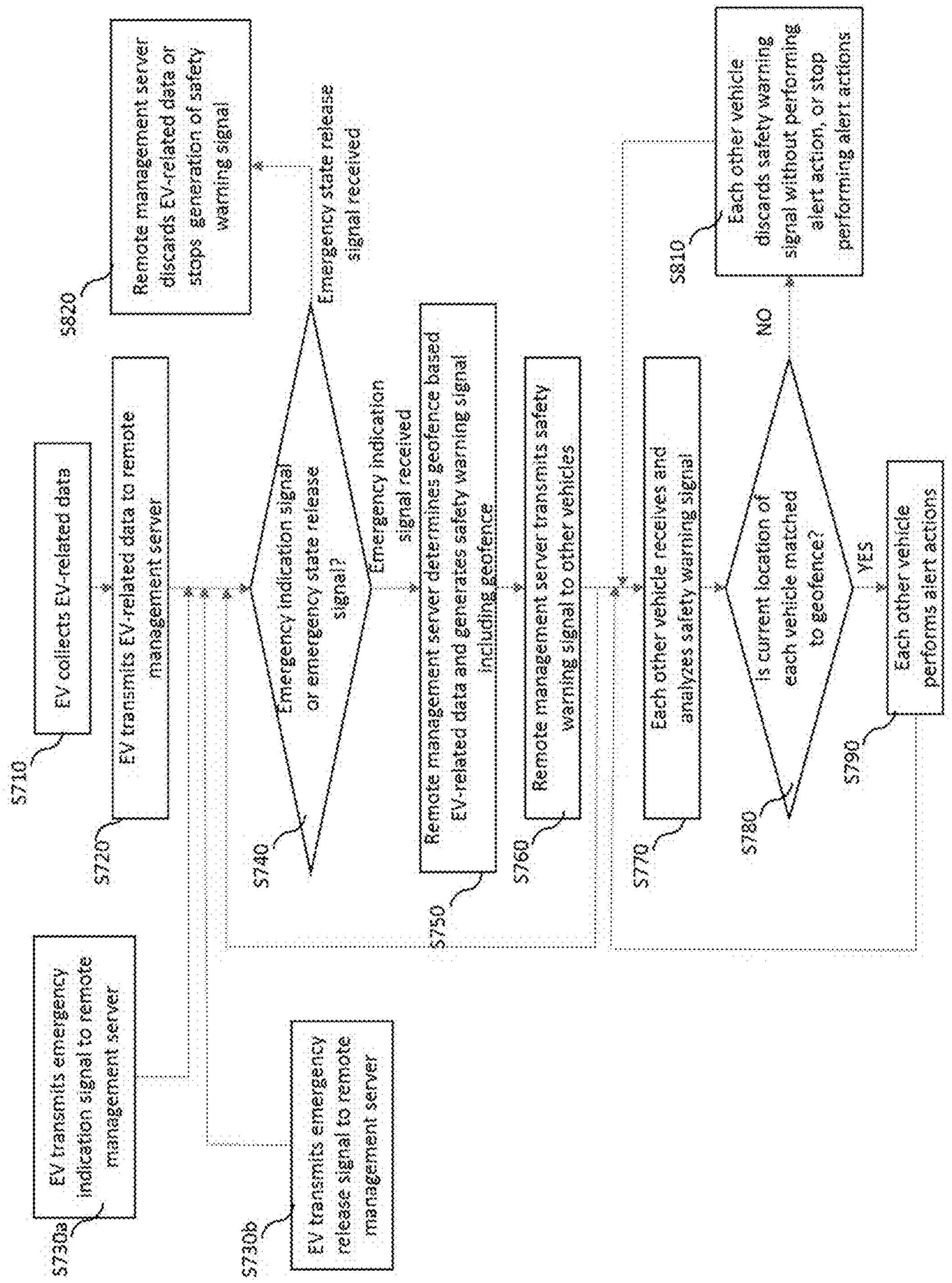
FIGS. 7A and 7B are flow charts illustrating a method for providing an EV alert according to an exemplary embodiment of the present disclosure.
Figure 7B:
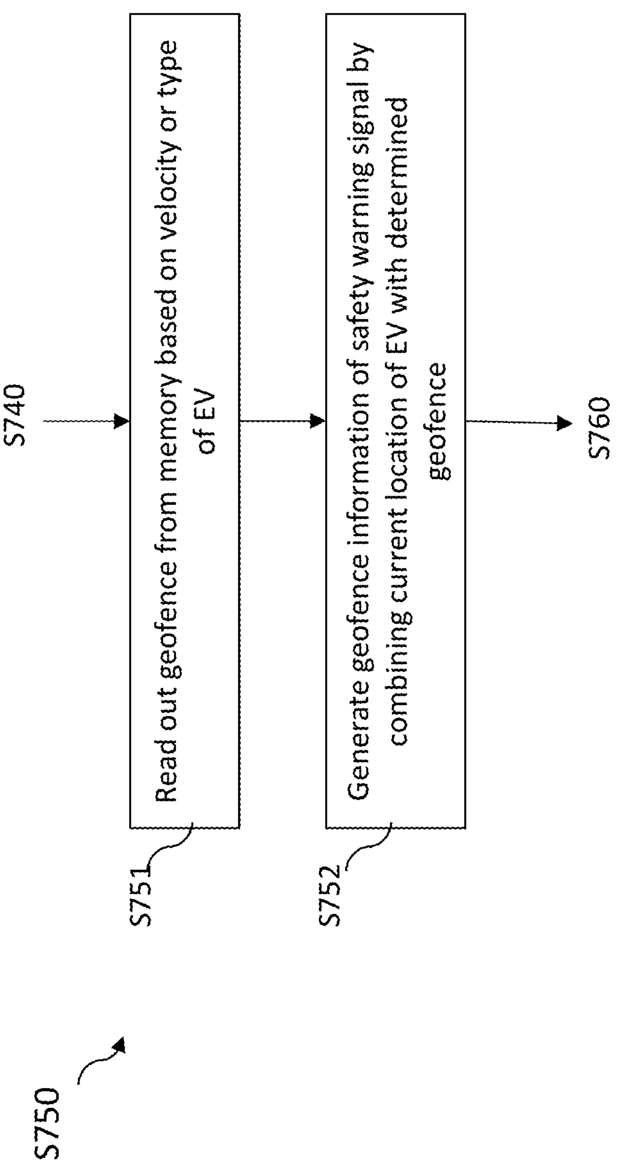

FIGS. 7A and 7B are flow charts illustrating a method for providing an EV alert according to an exemplary embodiment of the present disclosure.

Referring now to FIGS. 1, 2A-2C and 7A, when the EV 10 is in an emergency state where it heads to an emergency scene, the EV 10 triggers an emergency state and transmit an emergency indication signal 12 to the remote management server 20 via the communication network 15 (S730*a*). In case where the EV 10 is released from the emergency state, or the EV 10 is transitioned to a normal state which is not emergency state, the EV 10 may transmit an emergency release signal 13 to the remote management server 20 (S730*b*). The emergency state can manually be triggered by an operator of the EV 10 or can automatically be triggered when flashing lights and/or sirens of the EV 10 are activated. In addition, the EV 10 collects EV-related data 11 such as a location, a type, a velocity or the like using the sensor devices 160 (S710) and transmits the EV-related data 11 to the remote management server 20 (S720). In addition, in step S740, the remote management server 20 receives the EV-related data 11, the emergency indication signal 12 and/or the emergency release signal 13. Still in step S740, the remote management server 20 (e.g., processor 210) determines whether the emergency indication signal 12 is received or the emergency release signal is received. If it is determined that the emergency indication signal 12 is received, the method performs steps S750 to S790 and S810. If it is determined that the emergency release signal 13 is received, the method performs step S820.

In step S750, the remote management server 20 determines a geofence based on the EV-related data 11 and generates a safety warning signal 500*a* or 500*b* including geofence information 520 associated with the geofence.

In one embodiment, the geofence information 520 is directly provided as a set of location coordinates corresponding to a boundary of the determined geofence. In another embodiment, the geofence information 520 is indirectly provided as an indication (e.g., geofence function G(x)) that can be used by the subscriber device 300 to retrieve the geofence from the geofence information 520, more details of which will be described with reference to FIG. 2C.

In step S760, the remote management server 20 transmits the safety warning signal 500*a* or 500*b* to other vehicles 30*a* to 30*d*. In one embodiment, as depicted in FIG. 7B, when determining the geofence in step S750, the processor 210 of the remote management server 20 reads out a geofence from the memory 220 based on an EV type and/or an EV velocity (S751) and generates geofence information 520 of the safety warning signal 500*a* or 500*b* by combining the current location of the EV 10 and the determined geofence for the EV 10 (S752).

After step S760, the method may repeatedly go to step 740 to determine whether the emergency indication signal is received or the emergency state release signal is received.

In step S770, the subscriber device 300 of each vehicle 30*a* to 30*d* receives and analyzes the safety warning signal 500*a* or 500*b* to retrieve the geofence. In step S780, the subscriber device 300 (e.g., processor 310) determines whether a current location of the corresponding vehicle is matched to the geofence (e.g., whether the vehicle current location is located within the geofence). If a match is found between the current location and the geofence (YES), the processor 310 controls the alert-generation device 370 to perform one or more alert actions (S790); otherwise (NO), (e.g., if no match is found therebetween) the processor 310 may discard the safety warning signal 500*a* or 500*b* and perform no alert action (S810). After performing steps S790 and/or S810, the method may repeatedly go to step S770 to receive and analyze the safety warning signal 500*a* or 500*b*.

Figure 8:
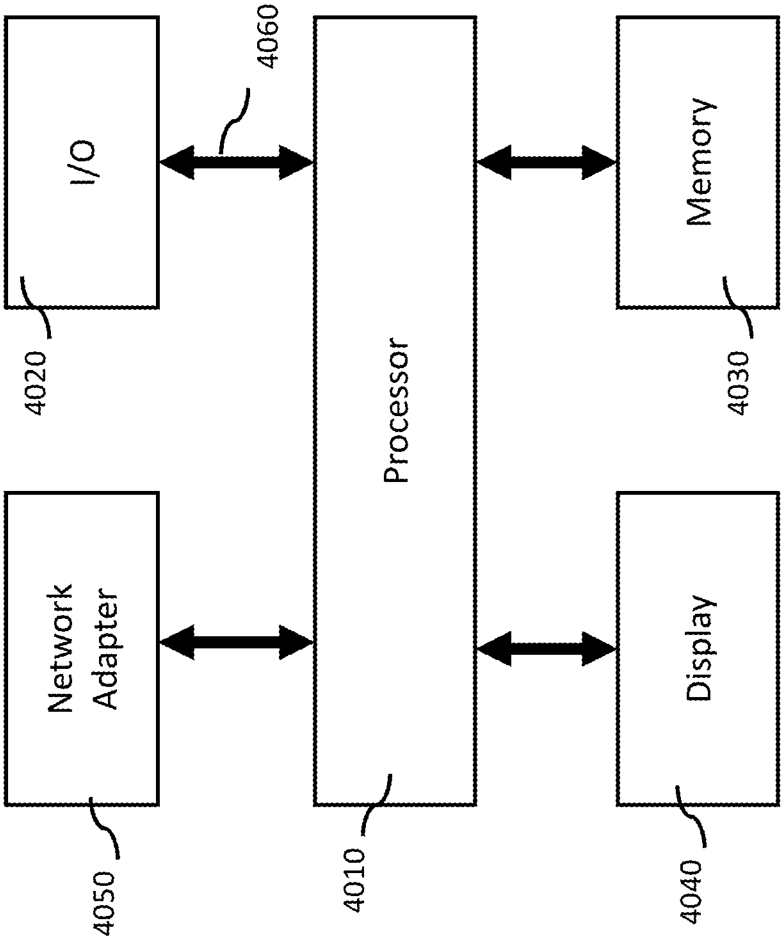
FIG. 8 is a block diagram of a computing system according to an exemplary embodiment of the present disclosure.

FIG. 8 is a block diagram of a computing system 4000 according to an exemplary embodiment of the present disclosure.

Referring to FIG. 8, the computing system 4000 may be used as a platform for performing: the functions or operations described hereinabove with respect to at least one of the emergency subscriber device 100, the remote management server 20 and the subscriber device 300; and the methods described with reference to FIGS. 7A and 7B.

Referring to FIG. 8, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing: the functions or operations described hereinabove with respect to at least one of the emergency subscriber device 100, the remote management server 20 and the subscriber device 300; and the methods described with reference to FIGS. 7A and 7B. For example, the program module may include routines, programs, objects, components, logic, data structures, or the like, for performing particular tasks or implement particular abstract data types. The processor (e.g., 4010) of the computing system 4000 may execute instructions written in the program module to perform: the functions or operations described hereinabove with respect to at least one of the emergency subscriber device 100, the remote management server 20 and the subscriber device 300; and the methods described with reference to FIGS. 7A and 7B. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) may communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), FirstNet, wireless LAN, Bluetooth, Zig Bee, or the like.

Exemplary embodiments of the present disclosure may include a system, a method, and/or a non-transitory computer readable storage medium. The non-transitory computer readable storage medium (e.g., the memory system 4030) has computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, system (or device), and computer program products (or computer readable medium). It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A system for providing an emergency vehicle alert, comprising:

a first device installed as a part of an emergency vehicle (EV) or attached to the EV, comprising:

one or more sensors configured to collect EV-related data including a velocity of the EV and a type of the EV from the EV;

a first processor configured to generate a data signal including the EV-related data; and a first transmitter configured to transmit the data signal to a management server; and the management server in communication with the EV, comprising:

a receiver configured to receive the data signal from the EV;

a second processor configured to:

select a geofence function for the EV from a plurality of geofence functions provided in a mapping table, wherein the geofence function is selected based on the type of the EV provided in the EV-related data and the velocity of the EV provided in the EV-related data, determine a geofence from the selected geofence function for the EV based only on the received EV-related data of the data signal wherein the selected geofence function varies a length and a width of the geofence, and generate a safety warning signal including geofence information associated with the geofence; and a second transmitter configured to transmit the safety warning signal to a second device installed as a part of another vehicle near the EV or attached to the another vehicle.

2. The system of claim 1, wherein the geofence information comprises a set of location coordinates corresponding to a boundary of the geofence.

3. The system of claim 1, wherein the geofence information comprises an indication that can be used by the second device to retrieve the geofence.

4. The system of claim 1, further comprising the second device, the second device comprising:

another receiver configured to receive the safety warning signal;

a third processor configured to:

determine whether the another vehicle is located within the geofence based on the safety warning signal;

control an alert-generation device to perform one or more alert actions when the another vehicle is located within the geofence; and control the alert-generation device to perform no alert action when the another vehicle is out of the geofence; and the alert-generation device configured to perform the alert actions.

5. The system of claim 1, wherein the size of the geofence decreases when the velocity of the EV decreases.

6. The system of claim 1, wherein the geofence is defined to extend farther in a forward direction of the EV than any other directions.

7. The system of claim 1, wherein the geofence is defined to exclude all locations in a rear direction of the EV.

8. The system of claim 1, wherein the EV-related data further comprises a location of the EV.

9. The system of claim 4, wherein the alert actions comprise at least one of an audible warning signal, a visual warning signal to an operator of the another vehicle.

10. The system of claim 1, wherein the safety warning signal comprises at least one of an ID of the EV, geofence information, the type of the EV, one or more alert actions, and a location of the EV.

11. A system for providing an emergency vehicle alert, comprising:

a receiver configured to receive emergency vehicle (EV) related data including a velocity of an EV and a type of the EV transmitted from the EV; and a processor configured to determine a geofence for the EV from a geofence function by selecting the geofence function from a plurality of geofence functions provided in a mapping table, wherein the geofence function selection is based only on the velocity of the EV and the type of the EV, and wherein the selected geofence function varies a length and a width of the geofence.

12. The system of claim 11, where the processor is further configured to generate a safety signal including geofence information associated with the geofence.

13. The system of claim 11, further comprising: a second transmitter configured to transmit the safety warning signal to another device installed as a part of another vehicle near the EV or attached to the another vehicle.

14. The system of claim 11, wherein the geofence information comprises a set of location coordinates corresponding to a boundary of the geofence.

15. The system of claim 11, wherein the geofence information comprises an indication that can be used by the second device to retrieve the geofence.

16. The system of claim 11, wherein the size of the geofence decreases when the velocity of the EV decreases.

17. The system of claim 11, wherein the geofence is defined to extend farther in a forward direction of the EV than any other directions.

18. The system of claim 11, wherein the geofence is defined to exclude all locations in a rear direction of the EV.

19. A method for providing an emergency vehicle alert, comprising:

receiving, at a management server, emergency vehicle (EV)-related data including a velocity of an EV and a type of the EV transmitted from the EV, the management server being in communication with the EV; and determining, at the management server, a geofence for the EV from a geofence function by selecting the geofence function from a plurality of geofence functions provided in a mapping table, wherein the geofence function selection is based only on the velocity of the EV and the type of the EV, and wherein the selected geofence function varies a length and a width of the geofence.

20. The method of claim 19, further comprising generating, at the management server, a safety warning signal including geofence information associated with the geofence.

21. The method of claim 19, further comprising transmitting, at the management server, the safety warning signal to another device installed as a part of another vehicle near the EV or attached to the another vehicle.

22. The method of claim 19, wherein the geofence information comprises a set of location coordinates corresponding to a boundary of the geofence.

23. The method of claim 19, wherein the geofence information comprises an indication that can be used by the second device to retrieve the geofence.

24. The method of claim 19, wherein the size of the geofence decreases when the velocity of the EV decreases.

25. The method of claim 19, wherein the geofence is defined to extend farther in a forward direction of the EV than any other directions.

26. The method of claim 19, wherein the geofence is defined to exclude all locations in a rear direction of the EV.

27. A system for providing an emergency vehicle alert, comprising:

a receiver configured to receive emergency vehicle (EV)-related data including a velocity of an EV and a type of the EV transmitted from the EV; and a processor configured to determine a geofence for the EV from a geofence function by selecting the geofence function from a plurality of geofence functions provided in a mapping table, wherein the geofence function is only based on the velocity of the EV and the type of the EV, and wherein the selected geofence function varies a length and a width of the geofence.

* * * * *